United States Patent [19]

Maddox

[11] Patent Number: 4,511,309
[45] Date of Patent: Apr. 16, 1985

[54] VIBRATION DAMPED ASYMMETRIC ROTOR CARRYING LIQUID RING OR RINGS

[75] Inventor: James P. Maddox, Sherman Oaks, Calif.

[73] Assignee: Transamerica Delaval Inc., Lawrenceville, N.J.

[21] Appl. No.: 457,005

[22] Filed: Jan. 10, 1983

[51] Int. Cl.³ ............................................. F01K 25/06
[52] U.S. Cl. ...................................... 415/202; 415/88
[58] Field of Search .................. 415/62, 66, 67, 88, 415/89, 202; 60/649, 673

[56] References Cited

U.S. PATENT DOCUMENTS

| | | | |
|---|---|---|---|
| 3,032,988 | 5/1962 | Kleckner | 60/39.35 |
| 3,758,223 | 9/1973 | Eskeli | 415/1 |
| 3,879,949 | 4/1975 | Hays et al. | 415/89 X |
| 3,972,195 | 8/1976 | Hays et al. | 60/649 X |
| 3,995,428 | 12/1976 | Roberts | 60/641 |
| 4,063,417 | 12/1977 | Shields | 60/641 |
| 4,087,261 | 5/1978 | Hays | 55/41 |
| 4,141,219 | 2/1979 | Frosch | 60/645 |
| 4,227,373 | 10/1980 | Amend et al. | 60/618 |
| 4,258,551 | 3/1981 | Ritzi | 60/654 |
| 4,298,311 | 11/1981 | Ritzi | 415/80 |
| 4,336,693 | 6/1982 | Hays et al. | 60/651 X |
| 4,339,923 | 7/1982 | Hays et al. | 60/673 |
| 4,391,102 | 7/1983 | Studhalter et al. | 60/649 |

Primary Examiner—Everette A. Powell, Jr.
Attorney, Agent, or Firm—William W. Haefliger

[57] ABSTRACT

An asymmetric rotating rotor prevents or inhibits formation of waves in a liquid ring or rings.

11 Claims, 8 Drawing Figures

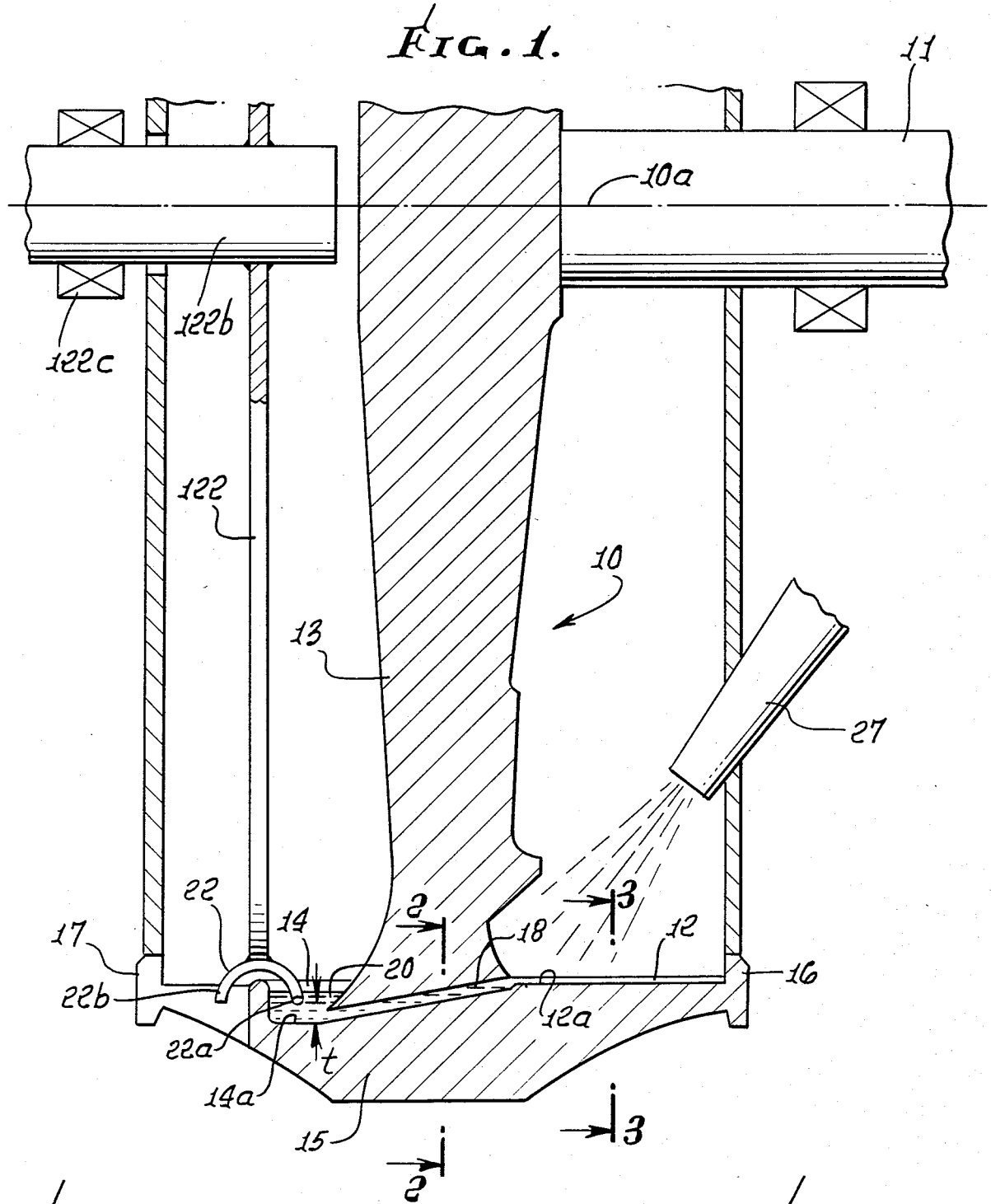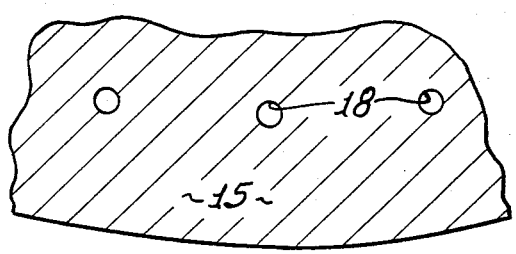

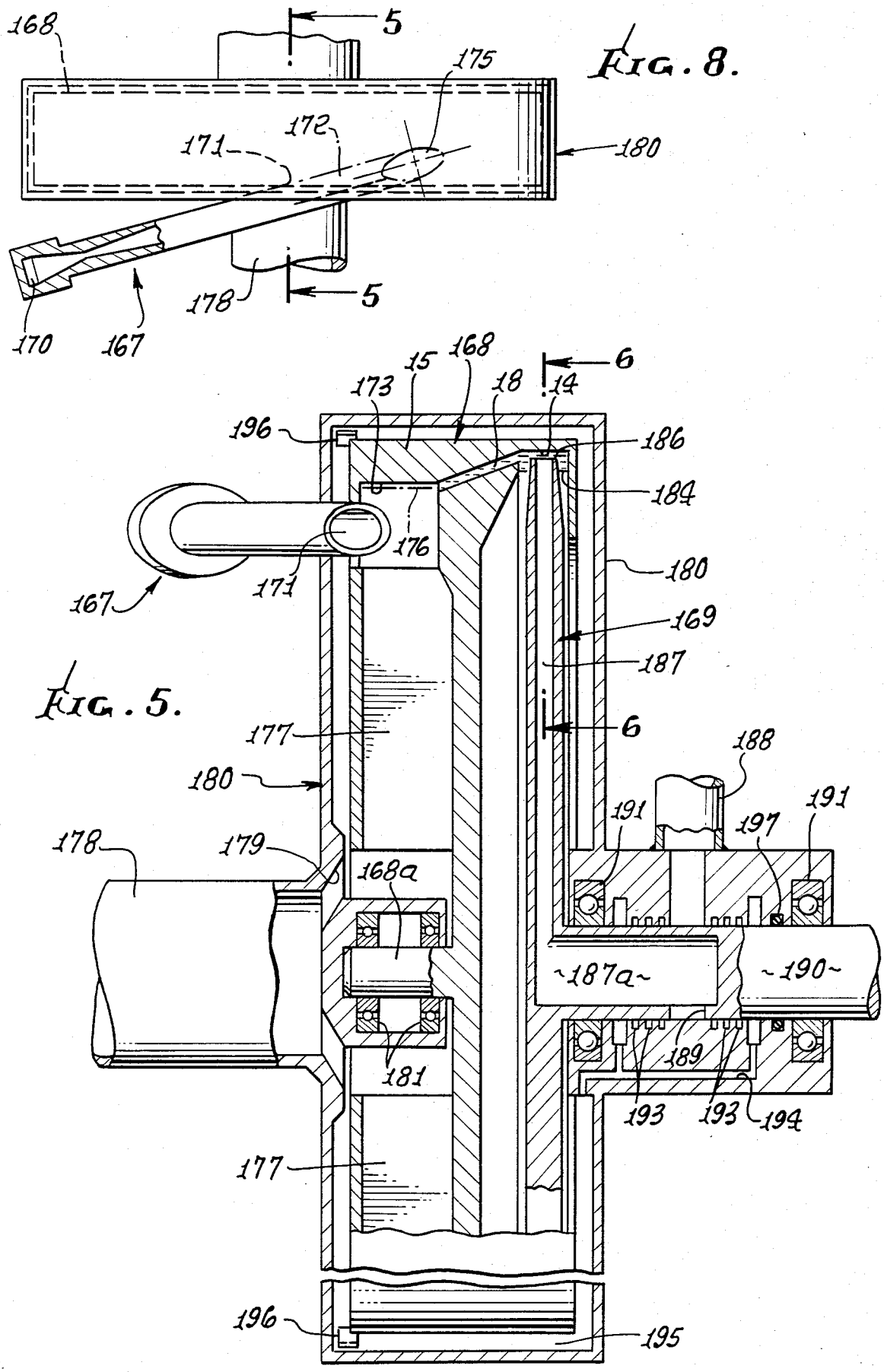

VIBRATION DAMPED ASYMMETRIC ROTOR CARRYING LIQUID RING OR RINGS

BACKGROUND OF THE INVENTION

This invention relates generally to damping and controlling vibration of rotors, and more particularly concerns such damping and controlling of vibration of rotors which carry rotating rings of liquid.

The dynamic stability of rotors partially filled with viscous incompressible fluids is critical to successful operation of many types of devices employing such rotors. Examples are centrifuges, liquid cooled machinery, spinning ordinance projectiles and two-phase turbines, there being many others. Theoretical studies in which the equations characterizing rotor dynamics are coupled with equations of motion for rotating fluids have identified specific regimes of stable and unstable motion. Among important factors are angular frequency, rotor and housing stiffness and damping, and fluid properties. Unstable modes are caused by waves in the liquid which, if not damped or suppressed, can result in catastrophic failure of the machine. This phenomena has been encountered in rotary separators and turbines of the type described herein, and characterized by a rotating ring of liquid. Flow field observations have identified a liquid wave tending to surge and rotate relative to the liquid channel at frequencies typically in the range 85% to 95% of rotor speed.

SUMMARY OF THE INVENTION

It is a major object of the invention to provide method and apparatus for controlling or eliminating the vibrations in rotating rotors resulting from hydraulic instabilities. Basically, the method includes the prevention of formation of waves in liquid rings in rotating rotors, and the provision of asymmetry that controls and/or minimizes ring depth.

As will be seen, the invention is characterized by the provision of means for controllably removing liquid from an annular channel as for example by controlled drainage from one channel section to a second channel section, the second having a bottom spaced further from the rotor axis than the bottom of the first channel section.

It is a further object of the invention to provide axially spaced liquid separation and turbine channel sections, with provision for flow between such channels to minimize liquid depth in a relatively wider separation channel, and to controllably remove liquid from a relatively narrower turbine channel.

These and other objects and advantages of the invention, as well as the details of illustrative embodiments, will be more fully understood from the following description and drawings, in which:

DRAWING DESCRIPTION

FIG. 1 is enlarged cross section through a rotor incorporating the invention;

FIG. 2 is a fragmentary section on lines 2—2 of FIG. 1;

FIG. 3 is an enlarged section on lines 3—3 of FIG. 1;

FIG. 5 is an enlarged sectional elevation taken on lines 5—5 of FIG. 8;

FIG. 8 is a top plan view, partly in section, of the FIG. 4 combination.

DETAILED DESCRIPTION

Figure 4:
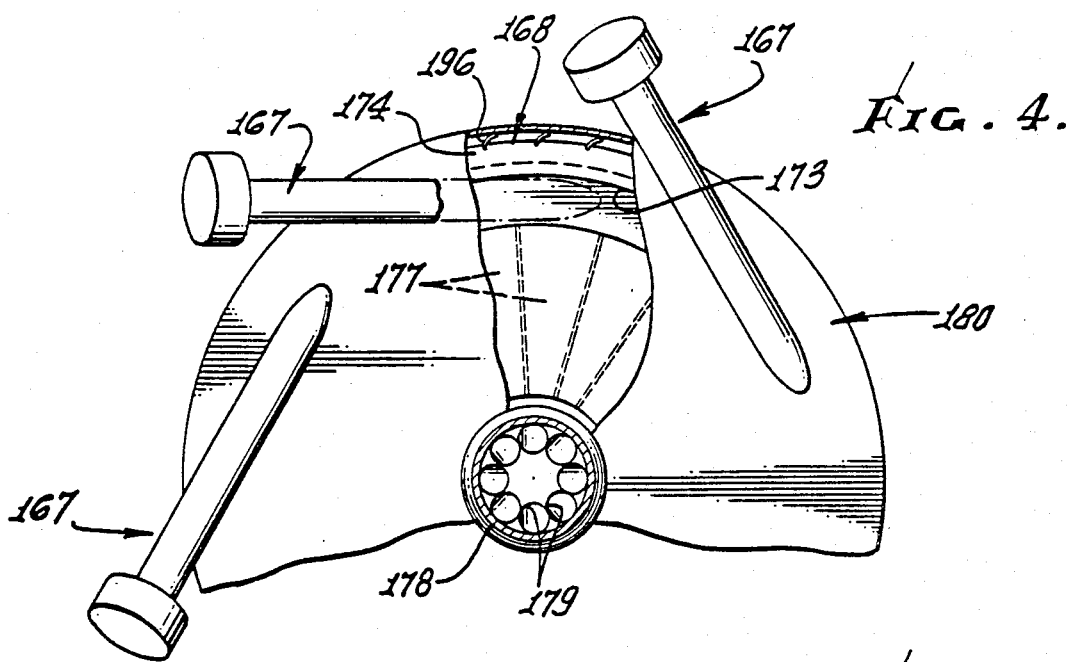
FIG. 4 is a side elevation of a nozzle, separator and turbine combination.
Figure 7:
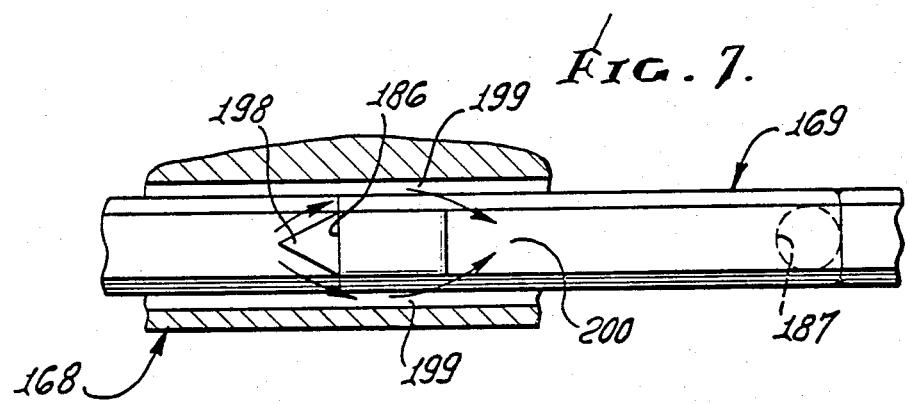
FIG. 7 is an enlarged section on lines 7—7 of FIG. 6.

In FIG. 1, a rotor 10 is rotatable about an axis 10a, as on an axle indicated at 11. The rotor defines channel structure including a first annular channel or section 12 at one side of rotor disc 13, and a second annular channel or section 14 at the opposite side of disc 13. A rotor peripheral flange 15 is integral with disc 13, and projects axially to define the two channels. Annular lips or rings 16 and 17 extend radially inwardly from flange 15, at the outer sides of the channels, to retain liquid therein.

In this regard, liquid tends to be maintained in each channel as by centrifugal force due to rotor rotation, and means is provided for removing liquid from the channel structure so that liquid depth is kept below a selected minimum value to inhibit surge wave development that otherwise is productive of rotor vibration during rotor and liquid rotation, as for example at rotor speeds of between 1,000 and 8,000 rpm.

Liquid is continually supplied to channel 14, from channel 12, as via annularly spaced drain passages 18 through the disc 13, as shown. Passages 18 are angled axially and radially due to the fact that the bottom 14a of channel section 14 is located further from axis 10a than the bottom wall 12a of channel section 12, the construction being asymmetric. Therefore, liquid tends to flow from channel 12 to channel 14, and the film thickness or depth on bottom 12a is kept below about 10 mils. Liquid is supplied to channel 12 as from a nozzle 27, the jet from the nozzle impinging on the channel bottom 12a and driving the rotor. The nozzle is angled in the direction of rotor rotation, so that the jet drives the rotor, as described for example in U.S. Pat. No. 3,879,949. Typical speeds of bottom wall or rim 12a are between about 600–800 ft/sec.

It will further be noted that the width of channel 14 is substantially less than that of channel 12, the latter being wider to fully accept the flow from nozzle 27 for driving the rotor. The sizes and numbers of the passages 18 are adjusted or controlled to remove all but a few mils thickness of liquid or rim 12a, as referred to. Also, it will be noted that the depth or thickness of the liquid 20 in channel 14 is greater than the few mils thickness of the liquid in channel 12. The inner inlet 22a of a scoop 22 penetrates liquid in channel section 14 for removing liquid from that channel section accompanied by torque development transferred to turbine wheel 122 for rotating and driving the turbine, as will be later described in connection with FIG. 5. Turbine 122 rotates on its own axle or suspension 122b, bearing supported at 122c. Scoop liquid discharges at 22b and over a rotor lip at the side of section 14 furthest from section 12. As shown the lip radius approximates the radius (from axis 10a) of the bottom of the first section.

For best results, the width of channel 14 is kept as low as possible, and the pick-up gap "t" is kept as small as practical (as for example less than 0.150"), to minimize film depth, for minimizing vibration.

The FIGS. 4–8 embodiment incorporates typical nozzles 167, separator wheel 168 rotating within a casing 180, and radial-flow turbine 169, shown as coaxially rotatable within the casing. A liquid and vapor or gas mixture is typically supplied at high pressure to the nozzle inlets 170. The mixture expands to low pressure at the nozzle exits 171, and the resulting high-velocity two-phase jets 172 impinge on the inner rim surface 173 of the rotating separator at locations 175, seen in FIG. 8. The liquid becomes concentrated in a layer 176 due to the inertia of the liquid and to centrifugal force, while the gas or steam separates and flows radially inward through passages 177 and enters the discharge pipe 178 through ports 179 in the stationary casing or housing 180. The rotating separator is supported by bearings 181 mounted in the housing 180, and receiving a separator wheel axle 168a.

The rotation of the separator 168 is impeded only by windage and bearing friction losses which can be very small. Thus only a very small relative velocity between the impinging jet 172 and the surface 173, aided by the torque imparted to the rotating separator by the inward flow of the gas through passages 177, serves to maintain the speed of the liquid layer 176 at a value nearly equal to that of the jets 172.

The liquid flows from the liquid layer 176 through passages 18 in the outer body of the rotating separator 168 and then into annular channel 14 which forms an integral part of the separator wheel 168. As a result another liquid layer 184 is formed, held in position by centrifugal force. This layer furnishes the fluid energy source for the turbine rotor 169 rotating concentrically within the separator wheel and having turbine inlet passages 186 immersed in the liquid layer 184.

Figure 6:
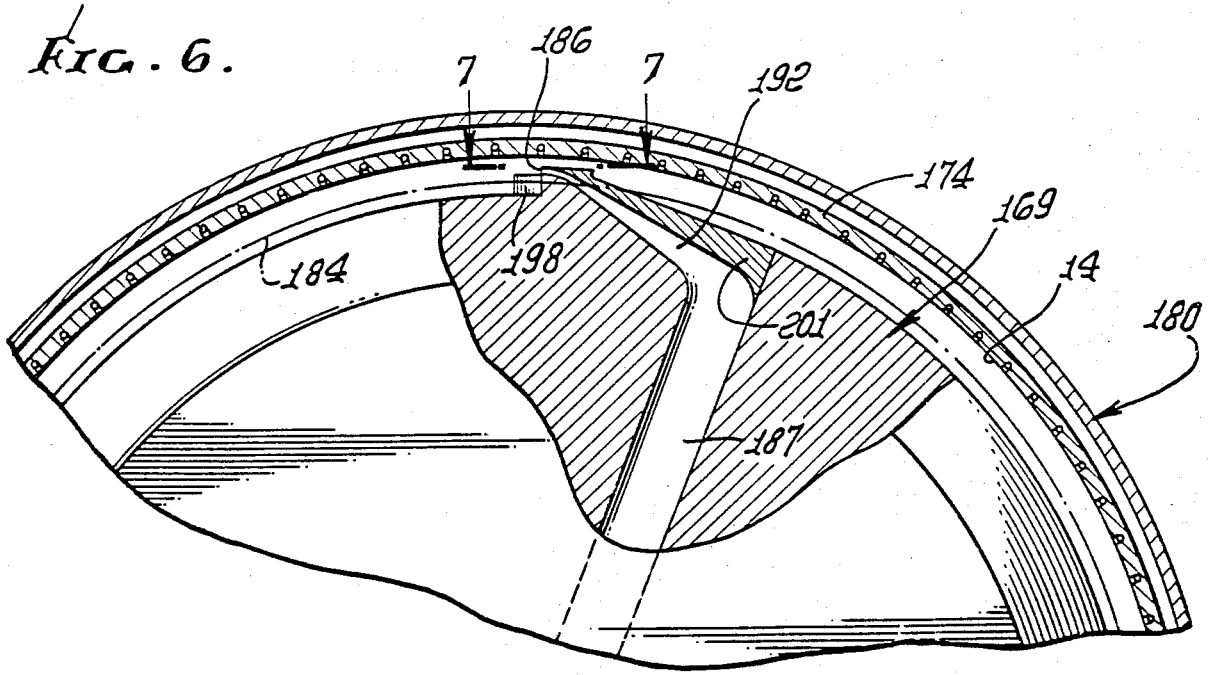
FIG. 6 is a fragmentary section on lines 6—6 of FIG. 5.

The turbine 169 may have blades or passages arranged to intercept the liquid layer 184, and FIGS. 5 and 6 show a radial-flow type turbine. The turbine rotor 169 typically rotates at a lower angular velocity than the separator wheel 168, causing liquid from the layer 184 to enter the inlets 186, flow radially inward through passages 187, and flow to liquid outlet pipe 188 via axial passage 187a in shaft 190 and apertures 189 in the wall of the turbine shaft 190. The shaft 190 is connected to the load to be driven. The turbine 169 is supported on bearings 191.

Each turbine passage 187 can optionally incorporate a diffuser 192 in which the velocity of the liquid entering inlet 186 can be partially converted to pressure such that, even allowing for the pressure drop in the radial passages 187 due to centrifugal force, the liquid pressure in discharge pipe 188 is substantially higher than the pressure in the turbine casing 180, and in fact, greater than the pressure at the nozzle inlets 170. Thus the diffusers 192 can supply any need for pumping of the liquid.

For operation with high pressure at the discharge 188, the leakage of liquid between the shaft 190 and the housing 180 is reduced by labyrinth seals 193 and drains 194 which return liquid leakage to the bottom 195 of the housing 180, where the liquid from this and other internal leakage sources is picked up by slinger blades 196 and thrown back into the jets 172. Leakage to the outside of housing 180 is prevented by a shaft seal 197.

The external shape of the turbine inlet ports 186 must be such as to minimize external drag and turbulence that could disturb and retard the liquid layer 184. The design shown in FIG. 7 employs a wedge-shaped strut 198 for the portion of the turbine inlet which intercepts the surface of the liquid layer 184 so that the flow intercepted by the strut is split at 199 with minimum disturbance and returned with little velocity loss to the liquid layer in the wake region 200 behind the turbine inlet 186.

To allow for operation at different liquid flow rates, the passage 192 may be equipped with moveable walls 201 which serve to vary the area of the turbine inlets 186.

Accordingly, the FIGS. 4–8 embodiment provides, essentially, a moving surface to enable separation of the gas and liquid phases with extremely low friction, said surface comprising a first freely rotatable wheel having a channel toward which the jet is tangentially directed. Also, FIGS. 4–8 provide a second wheel having a periphery extending asymmetrically to the periphery of the first wheel, whereby the two wheels define a gap therebetween to receive the separated first fluid and supply the fluid to the second wheel wherein the kinetic energy of the fluid is converted for example to shaft power and to pumping power.

I claim:
1. In apparatus of the character described, the combination comprising
   (a) a rotor defining an annular channel to receive liquid that rotates with the rotor about the axis thereof, said channel including first and second sections which are axially spaced apart and intercommunicate via at least one drainage path via which liquid flows from the first channel section to the second channel section, the bottom of the second channel section spaced further from said axis than the bottom of the first channel section;
   (b) nozzle means to jet fluid including liquid toward the first channel section which collects liquid in a film on the bottom of the first channel section, and
   (c) means removing liquid from the second channel section so that liquid depth in said film in the first channel section is controlled, and so that liquid depth in the second channel is kept below a selected minimum value, thereby to inhibit surge wave development that otherwise is productive of rotor vibration during such rotor and liquid rotation, the rotor defining a lip at the side of said second section furthest from said first section, the radius of said lip from said axis approximating the radius to the bottom of the first section.

2. The apparatus of claim 1 wherein the liquid depth in said film is less than about 10 mils.

3. The apparatus of claim 1 wherein there are multiple of said drainage paths spaced about the rotor axis and communicating with said channel sections, said paths intersecting the first channel section at the end of said ring closest to the second channel section, and intersecting the second channel section at the end thereof closest to the first channel section.

4. The apparatus of claim 2 wherein said second section has associated turbine structure carried to rotate independently of the rotor and including a scoop having an inlet in the second channel section, there being a pick-up gap between the scoop inlet and the bottom of the second section which is less than about 0.150 inch.

5. The apparatus of claim 4 wherein the bottom of the second channel section is located further from said axis than the bottom of the first channel section.

6. The apparatus of claim 3 wherein the depth of liquid in the second channel section remains greater than the depth of liquid in the first channel section.

7. The apparatus of claim 6 wherein the width of the first channel section substantially exceeds the width of the second channel section.

8. The apparatus of claim 5 wherein the width of the first channel section substantially exceeds the width of the second channel section.

9. The apparatus of claim 3 wheren the rotor includes a body separating said channel sections, said paths extending through the body to intercommunicate said channel sections.

10. The apparatus of claim 4 wherein said scoop extends over said lip to discharge liquid outside the rotor.

11. The apparatus of claim 4 wherein said turbine structure defines a liquid passage extending radially inwardly into proximity to said axis.

* * * * *